US012717617B2

(12) United States Patent
Chhabra et al.

(10) Patent No.: US 12,717,617 B2
(45) **Date of Patent: *Aug. 25, 2026**

(54) VIRTUAL QUEUE OPTIMIZATION

(71) Applicant: Micron Technology, Inc., Boise, ID (US)

(72) Inventors: Bhumika Chhabra, Boise, ID (US); Zahra Hosseinimakarem, Boise, ID (US); Carla L. Christensen, Boise, ID (US); Radhika Viswanathan, Boise, ID (US)

(73) Assignee: Micron Technology, Inc., Boise, ID (US)

(*) Notice: Subject to any disclaimer, the term of this patent is extended or adjusted under 35 U.S.C. 154(b) by 21 days.

This patent is subject to a terminal disclaimer.

(21) Appl. No.: 18/592,722

(22) Filed: Mar. 1, 2024

(65) Prior Publication Data

US 2024/0202026 A1 Jun. 20, 2024

Related U.S. Application Data

(63) Continuation of application No. 16/987,765, filed on Aug. 7, 2020, now Pat. No. 11,922,212.

(51) Int. Cl.

| | |
|---|---|
| ***G06F 9/48*** | (2006.01) |
| ***G06F 9/455*** | (2018.01) |
| ***G06F 9/54*** | (2006.01) |

(52) U.S. Cl.

CPC ........ *G06F 9/4881* (2013.01); *G06F 9/45558* (2013.01); *G06F 9/546* (2013.01); *G06F 2009/4557* (2013.01); *G06F 2009/45595* (2013.01)

(58) Field of Classification Search

None

See application file for complete search history.

(56) References Cited

U.S. PATENT DOCUMENTS

| | | | | |
|---|---|---|---|---|
| 6,529,786 | B1 * | 3/2003 | Sim | G06Q 10/025 705/5 |
| 6,845,361 | B1 | 1/2005 | Dowling | |
| 6,889,900 | B2 * | 5/2005 | Davies | G07C 11/00 235/385 |
| 7,212,983 | B2 * | 5/2007 | Redmann | G06Q 10/04 705/6 |

(Continued)

OTHER PUBLICATIONS

Smith "A Service for Queue Prediction and Job Statistics", 2011, 8pgs.

(Continued)

*Primary Examiner* — Van H Nguyen

(74) *Attorney, Agent, or Firm* — Brooks, Cameron & Huebsch, PLLC

(57) ABSTRACT

Methods and non-transitory machine-readable media associated with a virtual queue are described. A method can include receiving, by a processing resource, a request from a user to join a virtual queue, adding, by the processing resource, the user to the virtual queue, determining, by the processing resource, a queue optimization based on an estimated wait time for the user in the virtual queue, and providing to the user, by the processing resource, the queue optimization including the estimated wait time for the user in the virtual queue. The virtual queue can be updated in an example.

20 Claims, 6 Drawing Sheets

(56) References Cited

U.S. PATENT DOCUMENTS

| | | | | |
|---|---|---|---|---|
| 7,929,562 | B2 | 4/2011 | Petrovykh | |
| 8,831,963 | B2 | 9/2014 | Backer | |
| 8,935,219 | B2 | 1/2015 | Sainath | |
| 9,514,422 | B2 | 12/2016 | Argue | |
| 10,045,160 | B2 * | 8/2018 | Khatam | G06Q 10/06 |
| 10,121,170 | B2 | 11/2018 | DuLeone | |
| 10,304,276 | B2 * | 5/2019 | Schwartz | G07C 11/00 |
| 10,580,244 | B2 | 3/2020 | Geraghty et al. | |
| 10,650,070 | B2 | 5/2020 | Williams | |
| 10,943,188 | B2 | 3/2021 | Polk | |
| 11,004,290 | B2 * | 5/2021 | Schwartz | G07C 11/00 |
| 11,328,304 | B2 | 5/2022 | Opalka | |
| 11,423,412 | B2 | 8/2022 | Opalka | |
| 11,568,333 | B2 * | 1/2023 | Linguanti | A63G 21/00 |
| 11,593,738 | B2 | 2/2023 | Walsh | |
| 11,922,212 | B2 * | 3/2024 | Chhabra | G06F 9/546 |
| 2007/0286220 | A1 * | 12/2007 | Stenning | G07C 11/00 370/412 |
| 2017/0011311 | A1 | 1/2017 | Backer | |
| 2018/0129984 | A1 | 5/2018 | Polk | |
| 2019/0139104 | A1 | 5/2019 | Hanley et al. | |
| 2019/0272695 | A1 | 9/2019 | Schwartz et al. | |
| 2019/0311629 | A1 | 10/2019 | Sierra et al. | |
| 2019/0347885 | A1 | 11/2019 | Galley et al. | |
| 2020/0202655 | A1 | 6/2020 | Geraghty et al. | |

OTHER PUBLICATIONS

Doshi "WebQ: A Virtual Queue For Improving User Experience During Web Server Overload", 2015, pp. 135-140.

* cited by examiner

VIRTUAL QUEUE OPTIMIZATION

PRIORITY INFORMATION

This Application is a Continuation of U.S. application Ser. No. 16/987,765 filed on Aug. 7, 2020, and issued Mar. 5, 2024, as U.S. Pat. No. 11,922,212, the contents of which are incorporated herein by reference.

TECHNICAL FIELD

The present disclosure relates generally to non-transitory machine-readable media and methods for creating a virtual queue.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include a display used to view images or text. The display can be a touchscreen display that serves as an input device. When a touchscreen display is touched by a finger, digital pen (e.g., stylus), or other input mechanism, associated data can be received by the computing device for. The touchscreen display may include pictures and/or words, among others that a user can touch to interact with the device.

DETAILED DESCRIPTION

Figure 1:
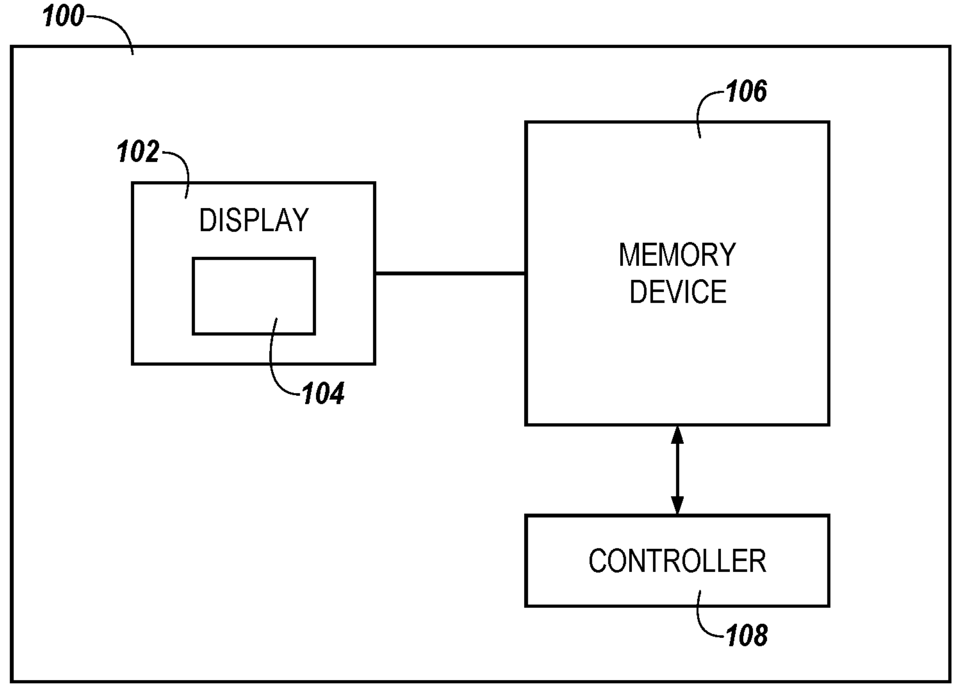
FIG. 1 is a functional block diagram in the form of a computing system including an apparatus having a display, a memory device, and a controller in accordance with a number of embodiments of the present disclosure.

Apparatuses, machine-readable media, and methods related to creation of a virtual queue are described. Queues associated with computing devices can include a first-in, first-out (FIFO) organized sequence of items, data, messages, jobs, etc. waiting for action. Call-center queues can include the use an automatic call distributor (ACD) to distribute incoming calls to specific resources (e.g., agents) in the center. ACDs hold queued calls in FIFO order until agents become available. Some approaches allow users to receive a callback instead of waiting in an ACD queue. For instance, the user leaves his or her phone number, and when an agent becomes available, the user receives a callback from the agent. Some other approaches include sending text messages when an agent is available. Yet other approaches to queues include sending messages or providing windows of time for a user to visit a particular attraction.

Examples of the present disclosure allow for a user to be placed in a virtual queue or a plurality of virtual queues associated with a physical location (e.g., restaurant, airport, theater, amusement park ride, etc.) and given an estimated wait time for completion of the virtual queue. A user can avoid waiting in a physical line and can instead be placed in the virtual queue and alerted when he or she should report to the physical location associated with the virtual queue. This can allow a user to spend time completing other tasks while he or she would have otherwise been waiting in line (e.g., drive to the physical location, visit a different physical location, etc.). In some examples, a user may be provided with an itinerary for visiting physical locations associated with the virtual queues and/or maps of a proposed best path for visiting the physical locations. For instance, examples can include a method for creation of a virtual queue including receiving, by a processing resource, a request from a user to join a virtual queue, adding, by the processing resource, the user to the virtual queue, and providing to the user, by the processing resource, an estimated wait time for the user in the virtual queue.

Other examples of the present disclosure can include an apparatus including a display, a memory device, and a controller coupled to the memory device configured to receive the request from the user to join the virtual queue, add the user to the virtual queue, and provided to the user the estimated wait time for the user in the virtual queue. As used herein, an "apparatus" can refer to, but is not limited to, any of a variety of structures or combinations of structures, such as a circuit or circuitry, a die or dice, a module or modules, a device or devices, or a system or systems, for example.

Yet other examples of the present disclosure include a non-transitory machine-readable medium comprising a processing resource in communication with a memory resource having instructions executable by the processing resource to receive a request from a user to join a plurality of virtual queues of physical locations, add the user to each one of the plurality of virtual queues, determine an estimated wait time for the user in each one of the plurality of virtual queues, and create an itinerary for visiting a physical location associated with each one of the plurality of virtual queues to the user based on the estimated wait times.

Yet other examples of the present disclosure include a non-transitory machine-readable medium comprising a processing resource in communication with a memory resource having instructions executable by the processing resource to receive a request from a user to join a plurality of virtual queues of physical locations, add the user to each one of the plurality of virtual queues, and determine an estimated wait time for the user in each one of the plurality of virtual queues. The instructions can be further executable to perform queue optimization, which can include, for instance, instructions executable to create an itinerary for visiting each one of the plurality of virtual queues to the user based on the estimated wait times, suggest an additional physical location to add to the itinerary based on the physical locations in the plurality of virtual queues, the created itinerary, and a location of the user, and provide a notification to the user regarding the itinerary.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 222 can reference element "22" in FIG. 2, and a similar element can be referenced as 322 in FIG. 3. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system including an apparatus 100 having a display 102, a memory device 106, and a controller 108 (e.g., a processing resource, control circuitry, hardware, firmware, and/or software) in accordance with a number of embodiments of the present disclosure. The memory device 106, in some embodiments, can include a non-transitory MRM, and/or can be analogous to the memory devices 661, 761 described with respect to FIGS. 6 and 7. The apparatus 100 can be a computing device; for instance, the display 102 may be a touchscreen display of a mobile device such as a smartphone. The controller 108 can be communicatively coupled to the memory device 106 and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 106 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

A non-limiting example of the present disclosure may include a user of a smartphone (e.g., apparatus 100) requesting to be added to a virtual queue at a restaurant, for instance, by using an application on the smartphone. The controller 108 receives the request and adds the user to the virtual queue 104. The controller may then provide the virtual queue 104 and an estimated wait time to the user via the display 102 of the smartphone. The user can see where he or she is in the virtual queue 104 and approximately how long he or she may wait before being seated. The user may be present at the restaurant or not present when accessing the virtual queue 104. For instance, a user may request to be added to the virtual queue 104 via an application on the smartphone while at home, and based on the estimated wait time, the user may choose to leave his or her home at a particular time to arrive at the restaurant when he or she reaches the front of the virtual queue 104. Alternatively, if the user is at the restaurant, he or she may choose to leave the restaurant to do another activity for some time based on the estimated wait time.

In some examples, a virtual reality (VR) or augmented reality (AR) notification may be present near a desired attraction (e.g., the restaurant) indicating a virtual queue. For instance, a user may be able to view the notification (e.g., a sign) via a mobile device (e.g., a pop-up VR sign in a navigation application) to indicate there is a virtual queue associated with the attraction. The user may choose to be added to the queue, in some instances, via the notification.

In some examples, the controller 108 may receive a request by the user to be placed in a plurality of virtual queues. Put another way, the controller 108 can request queue optimization. As used herein, "queue optimization" or "optimizing a queue" can include determining and/or suggesting a most efficient queue (e.g., shortest wait time overall, shortest wait time based on location, etc.) for a user. For instance, the user may request to be added to virtual queues at two restaurants. Wait times may be provided for each restaurant, and a user may choose which restaurant he or she wants to attend. Once the user completes the virtual queue (e.g., is seated at a table at a first restaurant), the user can be automatically removed from the virtual queue at the second restaurant. As used herein, "automatically" can include an action performed with limited or no user input and/or with limited or no prompting. In some examples, a user may remove himself or herself from a virtual queue manually. A user may be removed from a virtual queue if the user has come to the front of the virtual queue but has not checked in at the physical location associated with the virtual queue. For instance, if a user has been at the front of a restaurant's virtual queue for fifteen minutes, but the user has not arrived, the user may be removed from the virtual queue or his or her position may be moved down in the queue. While two physical locations (e.g., restaurants) are described herein, more than two virtual queues may be joined by a user. In some examples, when a user has joined more than one virtual queue, the user may be prompted to chose one of the virtual queues or be automatically removed from one of the queues. For instance, if the user has joined two virtual queues with similar estimated wait times, the user may be prompted to choose one virtual queue since it may not be possible for the user to be at both physical locations at once (e.g., upon completion of the virtual queues).

Figure 2:
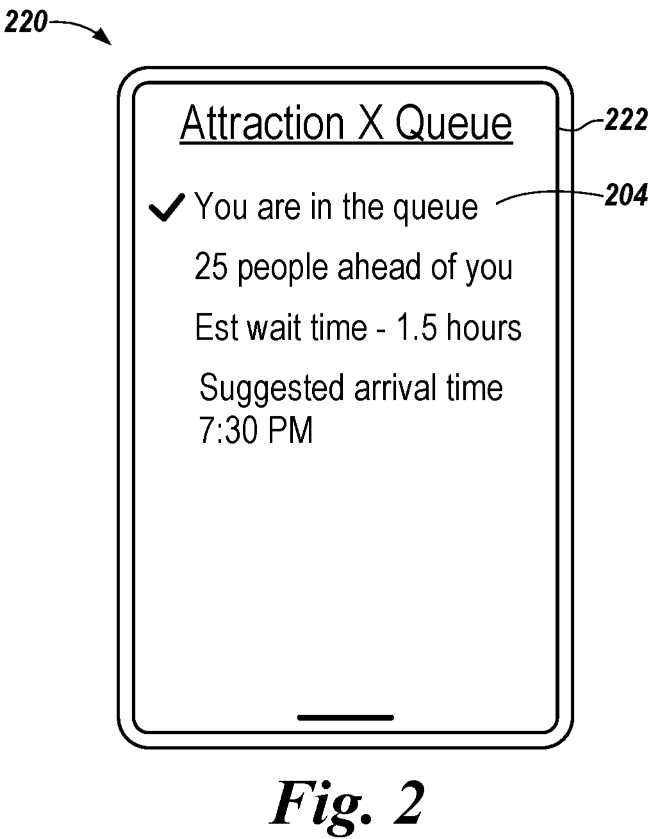
FIG. 2 is a diagram representing an example of a virtual queue on a display of a computing device in accordance with a number of embodiments of the present disclosure.

FIG. 2 is a diagram representing an example of a virtual queue 204 on a display 222 of a computing device 220 in accordance with a number of embodiments of the present disclosure. The computing device 220 can be, for instance a tablet with a touchscreen. A user may request to be added to a virtual queue 204 for Attraction X, which may be a restaurant, theater, amusement park ride, or landmark (e.g., Eiffel Tower), among others. The user may be added to a queue and provided with information associated with the physical location associated with the virtual queue 204. For instance, an estimated wait time may be provided, a position of the user in the virtual queue 204, and a suggested arrival time for the user.

Other information that may be provided can include a map to the location associated with the virtual queue 204, suggestions for attractions comparable to Attraction X in case the user does not want to wait the estimated wait time, wait times for the suggested comparable attractions, maps of and to comparable attractions, and information about Attraction X, among other information. In some examples, more than one virtual queue can be provided. For instance, a user may request access to the virtual queue 204 for Attraction X, which may be a restaurant, as well as access to a virtual queue of Attraction Y (not illustrated in FIG. 2), which may be a museum. Based on wait times, the user can choose to eat first or go to the museum, for instance. A suggested itinerary can be provided to the user in some examples.

In some examples, a group can be created and associated with the virtual queue 204. For instance, a user can create a group (e.g., family members at an amusement park), and the group can be added to the virtual queue 204. Each member of the group can be added to the virtual queue 204 and the creator of the group, other members of the group, or a combination thereof can track members of the group to determine their location (e.g., if they are at the physical location of the Attraction X associated with the virtual queue 204. For instance, if the group is a family planning to meet at Attraction X for lunch while at an amusement park, a parent who created the group can track other family members' locations in the amusement park to determine if they have arrived at Attraction X. All members of the family can be added to the virtual queue 204 and can check in at Attraction X upon arrival.

Figure 3:
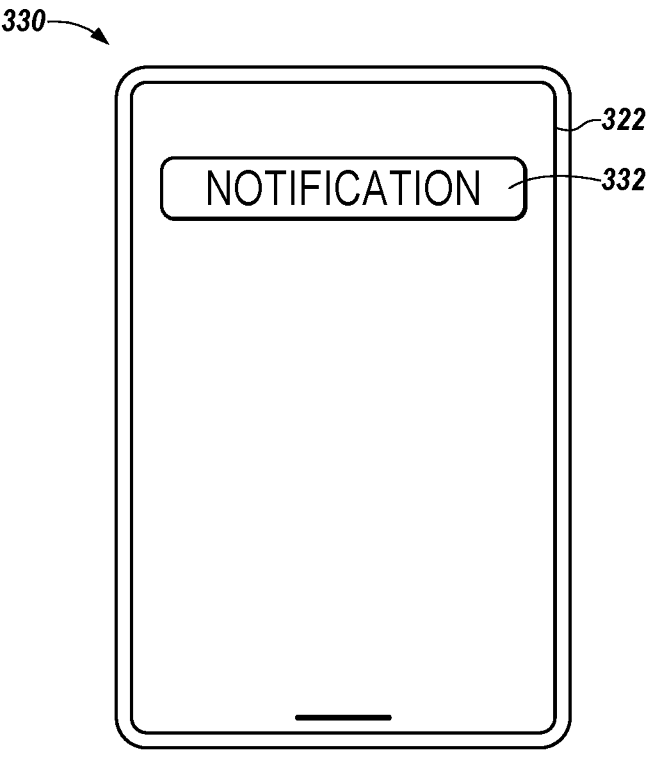
FIG. 3 is a diagram representing an example of a notification associated with a virtual queue on a display of a computing device in accordance with a number of embodiments of the present disclosure.

FIG. 3 is a diagram representing an example of a notification 332 associated with a virtual queue on a display 322 of a computing device 330 in accordance with a number of embodiments of the present disclosure. A user, for instance can receive the notification 332 via visual (e.g., banners, text alerts, etc.), verbal (e.g., audible), or physical notifications (e.g., vibration). The notifications may be made via the computing device 330 or a different computing device. For instance, a wearable device communicatively coupled to the computing device 330 can provide a physical indication, verbal indication, and/or a visual indication of a notification. For instance, the wearable device (e.g., a smartwatch, smart glasses, fitness tracker, etc.) may vibrate when a notification is available. The wearable device may emit a verbal command, which can accompany a visual notification. The wearable device may use any combination of the indications, among others. While a wearable device is described herein, other computing devices may be communicatively coupled to the computing device and receive indications. For instance, if the computing device is a smartphone, and the user has a communicatively coupled tablet in his or her briefcase, the tablet may also provide indications of a virtual queue notification 332.

Example notifications 332 can include an estimated wait time, a status update of the estimated wait time (e.g., increase, decrease, etc.), a warning that the user is going to be removed from the virtual queue, an itinerary suggestion, an itinerary change, a position change in the virtual queue, an indication the user has reached the front of the virtual queue, an indication the user is near the front of the virtual queue, or a combination thereof, among others.

Figure 4:
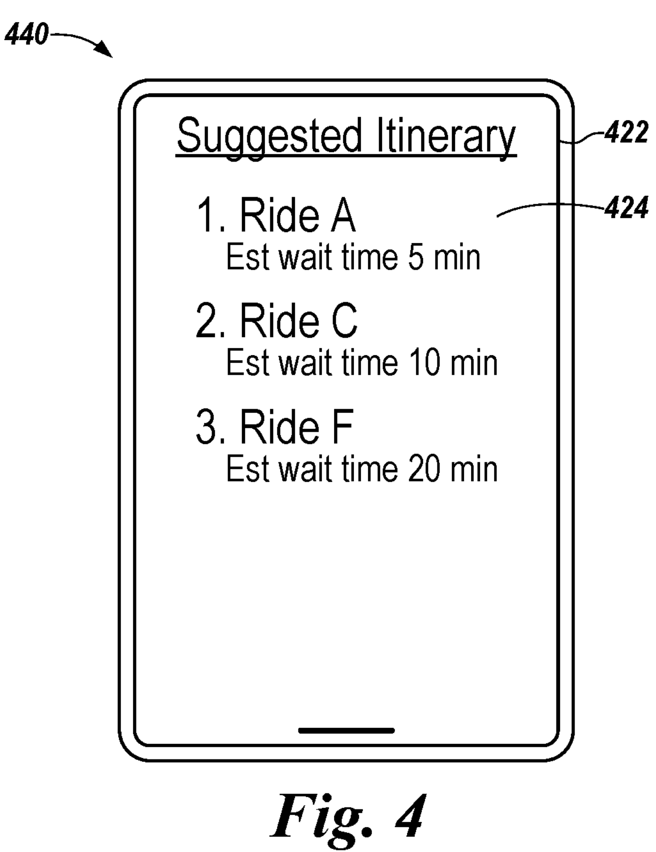
FIG. 4 is a diagram representing an example of a suggested itinerary associated with a virtual queue on a display of a computing device in accordance with a number of embodiments of the present disclosure.

FIG. 4 is a diagram representing an example of a suggested itinerary 424 associated with a virtual queue on a display 422 of a computing device 440 in accordance with a number of embodiments of the present disclosure. In the example illustrated in FIG. 4, a user may be at an amusement park or other location having a plurality of rides (e.g., Ride A, Ride C, Ride F, etc.). The user may request to be added to a plurality of virtual ride queues to reduce time waiting in a physical queue. For instance, the user may request to be added to the queues of Ride A, Ride C, and Ride F. Regardless of the order of the requests, the user may be provided with a suggested itinerary based on the estimated wait time of each ride. In some instance, the itinerary can be based on the location of the user, such that rides closer to the user may be suggested before rides further from the user, even if estimated wait times are longer. For instance, the itinerary may be provided to optimize the user's time based on estimated wait times and locations of the user and the rides. For instance, the proposed itinerary may allow for the greatest number of rides to be ridden in the shortest amount of time. The user may also be provided with suggestions to other attractions (e.g., other rides, restaurants, etc.) based on his or her location or suggestions to skip particular attractions if the estimated wait time for the virtual queue is above a particular threshold (e.g., over two hours) or if visiting a particular attraction limits other attractions (e.g., Ride F may be closed if the user chooses to wait for Ride C).

In some examples, the virtual queue is associated with a physical location having a physical queue. For instance, in the previous ride example, Ride A may have a virtual queue estimated wait time of five minutes. This may correspond to the physical queue, or the virtual queue may be different. For example, the user may be placed in a particular spot in the physical queue when he or she arrives at Ride A, or the user may be placed in a separate physical queue for users of the virtual queue.

Figure 5:
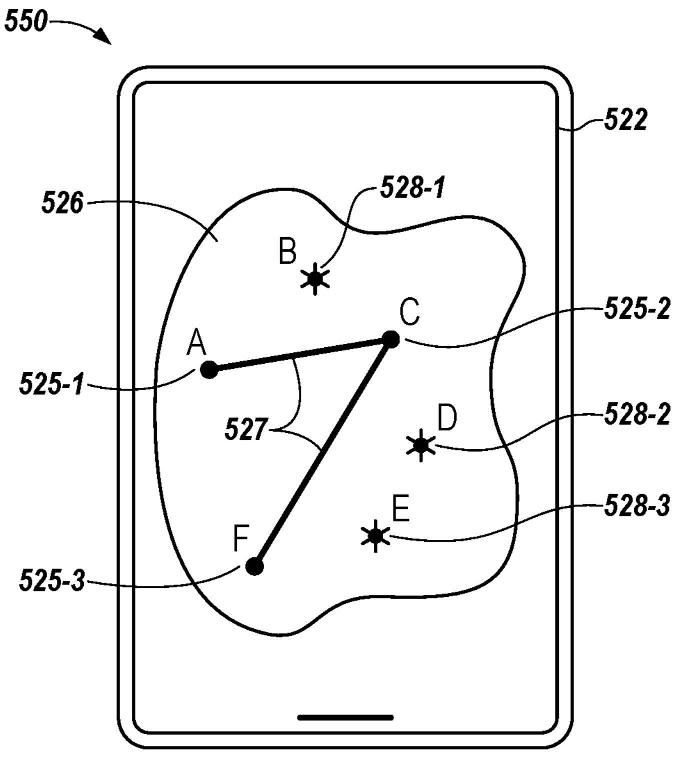
FIG. 5 is a diagram representing an example of a map associated with a virtual queue on a display of a computing device in accordance with a number of embodiments of the present disclosure.

FIG. 5 is a diagram representing an example of a map 526 associated with a virtual queue on a display 522 of a computing device 550 in accordance with a number of embodiments of the present disclosure. For instance, in a non-limiting example, the map 526 is a map of a city having a plurality of attractions A 525-1, C 525-2, F 525-3, B 528-1, D 528-2, and E 528-3. A user may request to be added to a virtual queue of attractions A 525 -1, C 525-2, and F 525-3. The user may be presented with the map 526 illustrating the locations of attractions A 525 -1, C 525-2, and F 525-3, as well as a proposed path 527 in which to follow to see attractions A 525 -1, C 525-2, and F 525-3. The user may be presented with suggested additional attractions B 528-1, D 528-2, and E 528-3 along with their locations with relation to the requested attractions A 525 -1, C 525-2, and F 525-3. A user may choose to add one or all of the additional attractions B 528-1, D 528-2, and E 528-3 to his or her list of virtual queues, and the map 526 can be updated accordingly. A user can remove attractions, in some instances. More or fewer attractions may be chosen by the user and/or suggested to the user.

The attractions A 525-1, C 525-2, F 525-3, B 528-1, D 528-2, and E 528-3 may or may not be officially associated with virtual queues. For instance, attraction A 525-1 may be a landmark, such as a special tree. In such an example, the tree or it's associated owner (e.g., a National Park) may not track users in a physical or virtual queue to see the tree. The estimated wait time and virtual queue associated with the tree can be based on other users in the virtual queue waiting to see the tree. For instance, a user can use an application on his or her phone to see how many people have indicated on the application that they are physically in line to see the tree or plan to see the tree and have placed themselves in a virtual queue.

In some examples, a user can indicate that he or she wants to visit the attractions A 525-1, C 525-2, F 525-3, B 528-1, D 528-2, and E 528-3 in a day. The user can be provided with an itinerary as illustrated in FIG. 4, a map 526, or a combination thereof suggesting a plan for the day that considers the user's location and estimated wait times. In some examples, additional attractions can be added to the user's itinerary, and the itinerary can be reshuffled based on the addition. A user may also choose a starting point and an ending point for consideration in the itinerary.

Figure 6:
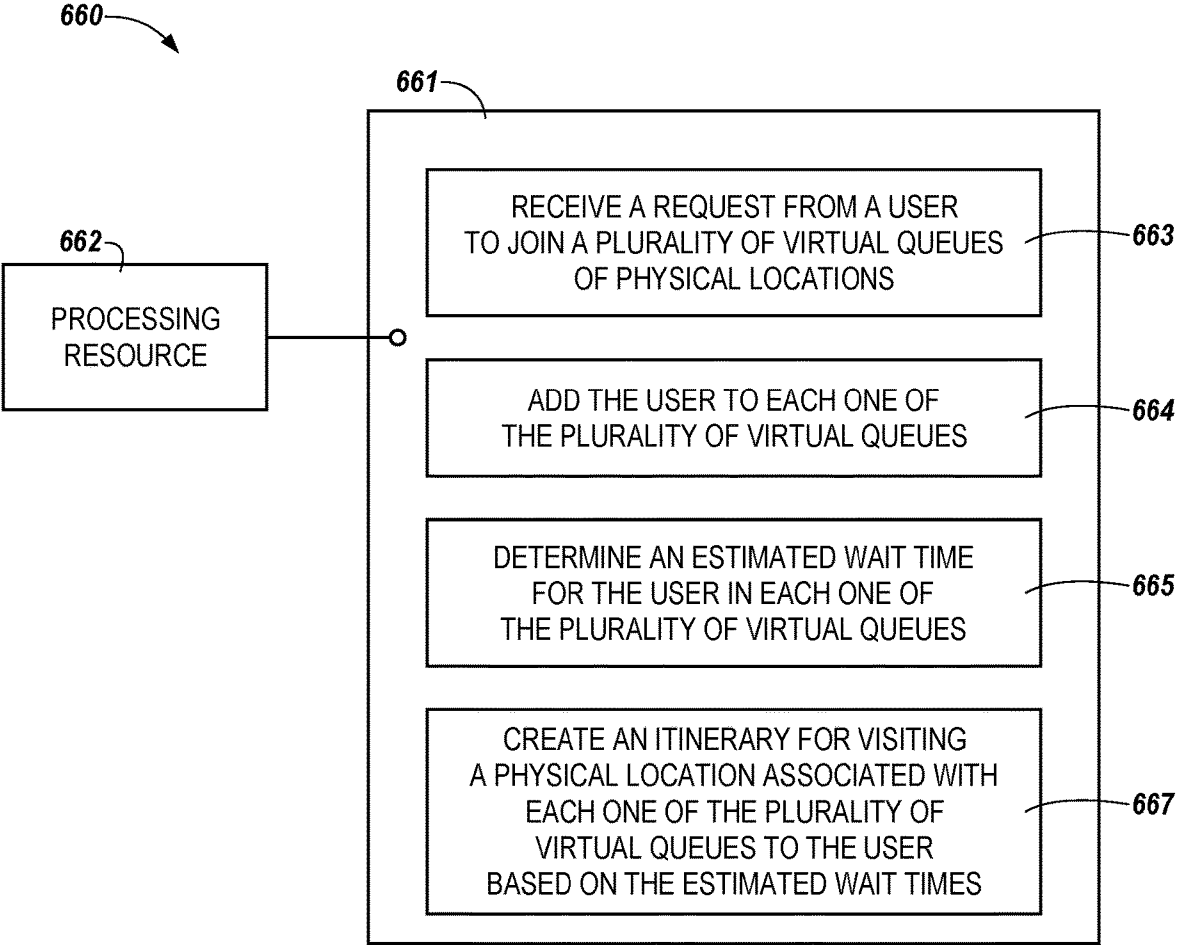
FIG. 6 is a functional diagram representing a processing resource in communication with a memory resource having instructions written thereon for creation of virtual queue in accordance with a number of embodiments of the present disclosure.

FIG. 6 is a functional diagram representing a processing resource 662 in communication with a memory resource 661 having instructions 663, 664, 665, 667 written thereon for creation of virtual queue in accordance with a number of embodiments of the present disclosure. The memory resource 661, in some embodiments, can be analogous to the memory device 106 described with respect to FIG. 1. The processing resource 662, in some examples, can be analogous to the controller 108 describe with respect to FIG. 1.

A system 660 can be a server or a computing device (among others) and can include the processing resource 662. The system 660 can further include the memory resource 661 (e.g., a non-transitory MRM), on which may be stored instructions, such as instructions 663, 664, 665, and 667. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 661 may be electronic, magnetic, optical, or other physical storage device that stores executable instructions. Thus, the memory resource 661 may be, for example, a non-transitory MRM comprising Random Access Memory (RAM), an Electrically-Erasable Programmable ROM (EEPROM), a storage drive, an optical disc, and the like. The memory resource 661 may be disposed within a controller and/or computing device. In this example, the executable instructions 663, 664, 665, and 667 can be "installed" on the device. Additionally and/or alternatively, the memory resource 661 can be a portable, external or remote storage medium, for example, that allows the system 660 to download the instructions 663, 664, 665, and 667 from the portable/external/remote storage medium. In this situation, the executable instructions may be part of an "installation package". As described herein, the memory resource 661 can be encoded with executable instructions for creation of a virtual queue.

The instructions 663, when executed by a processing resource such as the processing resource 662, can include instructions to receive a request from a user to join a plurality of virtual queues of physical locations. For instance, a user may issue the request via a menu of the computing device or may draw a request directly on a touchscreen display. The input received can include a touch input via a finger or a digital pen, among other touch input approaches. In some examples, optional virtual queues can be displayed via the display, and in response, the received input includes a request to be added to one of the optional virtual queues. For instance, a user may be presented with options as to which virtual queue or queues he or she would like to be added to, and the user can interact with the display (e.g., via a touch request) to choose the desired virtual queue or queues. In some examples, the request is made via an application installed on a computing device.

The instructions 664, when executed by a processing resource such as the processing resource 662, can include instructions to add the user to each one of the plurality of queues. For instance, if a user is at an amusement park, he or she may request to be added to a virtual queue of Ride A, Ride C, and Ride F. In response to the request, the user can be added to a virtual queue of each of the rides, and the instructions 665, when executed by a processing resource such as the processing resource 662, can include instructions to determine an estimated wait time for the user in each one of the plurality of virtual queues.

The estimated wait time can include an estimation of how long it will take the user to complete (e.g., reach the front of) the virtual queue. The estimated wait time can be determined based on average wait times of the physical location (e.g., average wait times at a restaurant on Saturday nights, average daytime wait times of a particular amusement park ride, etc.), weather conditions (e.g., rain at an amusement park vs. mild weather), special events at or near the physical location (e.g., convention near a restaurant, holiday celebration at an amusement park), other users in the virtual queue, users in an associated physical queue, or a combination thereof, among others.

In some examples, a notification to the user can be provided of the user's position in one of the plurality of virtual queues. For instance, a user can receive a notification (e.g., verbal, visual, physical, etc.) that Ride A has an estimated wait time of five minutes, that the user is tenth in the virtual queues, or a combination thereof. The user may be given notifications for each virtual queue in which the user is waiting. In some instances, the notification can include a window of time that a user has to arrive at the associated physical location (e.g., ride) before losing his or her position in the virtual queue. For example, once the user has reached the front of the virtual queue, he or she may be given a fifteen-minute window to reach the ride before losing his or her position in the queue (e.g., removed from virtual queue, moved down the virtual queues, etc.).

The instructions 667, when executed by a processing resource such as the processing resource 662, can include instructions to create an itinerary for visiting a physical location associated with each one of the plurality of virtual queues to the user based on the estimated wait times. For instance, in the amusement park example, the itinerary can include a suggested order in which to visit each ride to which the user was added to the associated virtual queue. In some instances, a map can be presented to the user as part of the itinerary illustrating the proposed itinerary. Suggestions may also be presented to the user of additional rides or other attractions (e.g., restaurants) to add to the suggested itinerary. In some examples, the proposed additions can be displayed on the map.

In some examples, the itinerary can be updated upon completion of one of the plurality of virtual queues. For instance, in the amusement park example, when a user reaches the front of a virtual queue at Ride A and proceeds to ride on Ride A, the itinerary is automatically updated. For example, the itinerary may change a first ride on the list to be Ride C, may include new recommendations, or a combination thereof. In some instances, the itinerary can be updated based on changes associated with a different user to one of the plurality of virtual queues. For example, if other users leave virtual queues in which the user is a part of, thus reducing the estimated wait time, the itinerary may be updated accordingly.

In some instances, a user can be removed from a virtual queue if the user reaches the front of one of the plurality of queues, if a threshold period of time passes (e.g., fifteen minutes, thirty minutes, etc.) before the user arrives at the physical location associated with the virtual queue, or a combination thereof. For example, if a user requests to be added to two different virtual queues associated with two different restaurants, the user may be removed from one of the virtual queues when he or she reaches the front of the other virtual queues. In such an example, a virtual queue can be provided to a computing device at an associated physical location, for example a computing device at an associated restaurant. This can allow for a restaurant to utilize a virtual queue without having to host the virtual queue itself. For instance, the restaurant may have a physical queue of users waiting at the restaurant and a virtual queue of users arriving as they reach the front of the virtual queue. The virtual queue may be separate from the physical queue or the queues may be merged together. Once the restaurant checks the user in, he or she may be removed (e.g., automatically removed) from virtual queues associated with other restaurants. If the user reaches the front of a virtual queue but is not checked into the restaurant within the threshold amount of time, he or she may be automatically removed from the virtual queue or his or her position may be moved down the queue.

Figure 7:
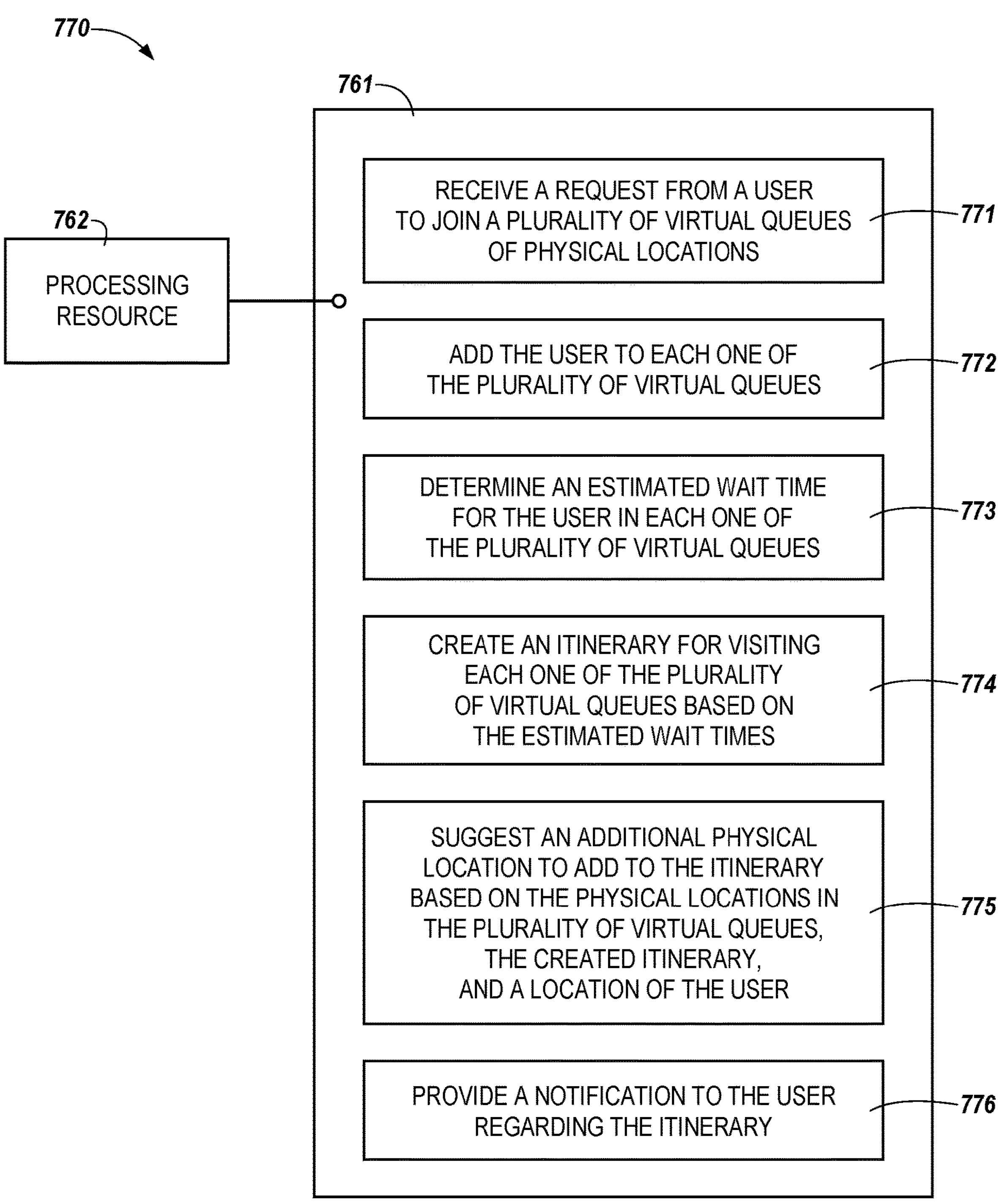
FIG. 7 is another functional diagram representing a processing resource in communication with a memory resource having instructions written thereon for creation of virtual queue in accordance with a number of embodiments of the present disclosure.

FIG. 7 is another functional diagram representing a processing resource 762 in communication with a memory resource 761 having instructions 771, 772, 773, 774, 775, 776 written thereon for creation of virtual queue in accordance with a number of embodiments of the present disclosure. The memory resource 761, in some embodiments, can be analogous to the memory resource 661 described with respect to FIG. 6 and/or the memory device 106 described with respect to FIG. 1. The processing resource 762, in some examples, can be analogous to the controller 108 described with respect to FIG. 1 and/or the processing resource 662 described with respect to FIG. 6.

A system 770 can be analogous to the system 660 described with respect to FIG. 6, in some examples, and can be a server or a computing device (among others) and can include the processing resource 762. The system 770 can further include the memory resource 761 (e.g., a non-transitory MRM), on which may be stored instructions, such as instructions 771, 772, 773, 774, 775, and 776.

The instructions 771, when executed by a processing resource such as the processing resource 762, can include instructions to receive a request from a user to join a plurality of virtual queues of physical locations, and the instructions 772, when executed by a processing resource such as the processing resource 762, can include instructions to add the user to each one of the plurality of virtual queues. For instance, if a user is traveling in a city and looking to visit tourist destinations, he or she can request to join and be added to a plurality of virtual queues associated with attractions around the city (e.g., museums, historical sites, restaurants, etc.).

The instructions 773, when executed by a processing resource such as the processing resource 762, can include instructions to determine an estimated wait time for the user in each one of the plurality of virtual queues, and the instructions 774, when executed by a processing resource such as the processing resource 762, can include instructions to create an itinerary for visiting each one of the plurality of virtual queues based on the estimated wait times. For instance, in the tourist example, estimated wait times for different tourist attractions can be determined (e.g., based on other users in the virtual queues, typical wait times, weather conditions, etc.) and suggested itineraries can be created. For instance, based on the wait estimated wait times, location of the users and the tourist attractions, or a combination thereof, the user can be provided with a suggested itinerary or itineraries to visit the tourist attractions. The itinerary may be based on a most efficient route, a route based on a starting point and ending point, or a combination thereof, among others. For example, a user may enter a start point (e.g., hotel) and end point (e.g., particular restaurant), and the itinerary may be created based on estimated wait times and the start and end points.

The instructions 775, when executed by a processing resource such as the processing resource 762, can include instructions to suggest an additional physical location to add to the itinerary based on the physical locations in the plurality of virtual queues, the created itinerary, and a location of the user. For instance, in the tourist city example, as the user walks around the city, if he or she is nearing an attraction, the user may receive a suggestion to visit the attraction based on an estimated wait time associated with the attraction and how the attraction may fit into the current itinerary. In some examples, a map of the itinerary, a map of the suggested physical location, or a combination thereof can be displayed for a user. The instructions 776, when executed by a processing resource such as the processing resource 762, can include instructions to provide a notification to the user regarding the itinerary. The notification, for instance, can include a change in the itinerary, a suggestion to the itinerary, a change in the estimated wait time of a virtual queue, a position of the user in a virtual queue, or a window of time before the user is removed from the queue, among other notifications.

Figure 8:
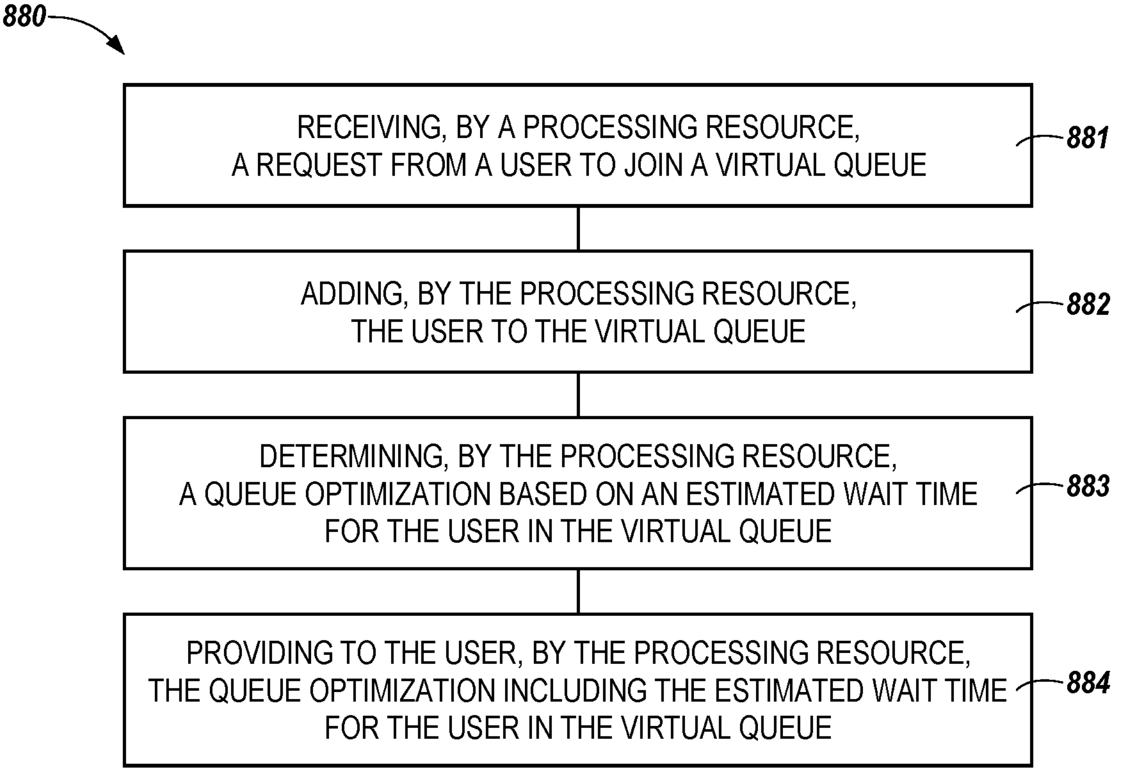
FIG. 8 is a flow diagram representing an example method for creating a virtual queue in accordance with a number of embodiments of the present disclosure.

FIG. 8 is a flow diagram representing an example method 880 for creating a virtual queue in accordance with a number of embodiments of the present disclosure. The method 880, in some examples may be performed using apparatus 100 as described with respect to FIG. 1 and/or systems 660 and 770 as described with respect to FIGS. 6 and 7, respectively.

At 881, the method 880 includes receiving, by a processing resource, a request from a user to join a virtual queue. For instance, the virtual queue can be associated with a physical location such as a restaurant, amusement park ride, tourist attraction, or other attraction, among others. The physical location may have a physical queue. For instance, an amusement park ride may have a physical queue in which visitors physically stand or sit and wait. The virtual queue can be the same as the physical queue, such that the virtual queue places (e.g., reserves a place for) the user in a particular spot in the physical queue, or the virtual queue and the physical queue may be different queues. In such an example, the physical location (e.g., a restaurant) may alternate queues when allowing users into the physical location (e.g., seating the users at open tables).

The method 880, at 882, includes adding, by the processing resource, the user to the virtual queue, and at 883, the method 880 includes determining, by the processing resource, a queue optimization based on an estimated wait time for the user in the virtual queue. For instance, determining the queue optimization comprises determining which of the virtual queue or a different queue is a more efficient queue. In an example, if the wait time for the virtual queue is one hour, but the processing resource identifies a different, more efficient queue (e.g., 30 minutes) based on the user's location, it may determine the different queue is the more optimal queue.

At 884, the method 880 includes providing to the user, by the processing resource, the queue optimization including the estimated wait time for the user in the virtual queue. The user can be provided (e.g., via a mobile device application) with a suggestion of the more optimal queue (e.g., whether it is the virtual queue or a different queue) and the estimated wait time for one or both. The estimated wait time, in some instances, can be estimated based on other users accessing the virtual queue, average wait times at the physical location, weather conditions, special events, or a combination thereof, among others. In some examples, the user can be sent a notification regarding the status of the estimated wait time. The notification, for instance, can include an increase or a decrease in the estimated wait time, a change in position of the user in the queue, or a combination thereof, among others.

The notification, in some examples, can include notification of removal of the user from the virtual queue. For instance, the user may be removed from the virtual queue after a particular time period has elapsed. If the user reaches the front of the virtual queue (or a particular position in the virtual queue) but does not arrive at the associate physical location before the particular time period elapses, he or she may be removed from the queue or his or her position in the virtual queue may be changed (pushed down in the virtual queue). The user may be notified when removal occurs, may be give a warning that removal will occur at a certain time, or a combination thereof.

In some instances, the processing resource can receive a request to join a different virtual queue. The user can be added to the different virtual queue and based on the user's completion of the one of the queues, the user can be removed from a queue. For example, if a user is added to the original virtual queue at a first restaurant and a different virtual queue at a second restaurant, and the table at the second restaurant becomes available first, the user is removed from the original virtual queue at the first restaurant. If a table at the first restaurant becomes available first, the user completes the original virtual queue and as a result is removed from the different virtual queue at the second restaurant. The removal is automatic, in some examples.

In some instances, the processing resource can receive the request to join a different virtual queue, and upon receiving the request, a recommendation can be provided of an order in which to visit physical locations associated with the virtual queue and the different virtual queue. For instance, if the first virtual queue requested is a museum and the second virtual queue requested is a restaurant, based on the queue optimization (e.g., their respective estimated wait times), the recommendation can be provided. For instance, if the virtual queue associated with the museum has an estimated wait time of five minutes, but the virtual queue associated with the restaurant has an estimated wait time of two hours, the user may be provided with a suggested itinerary of museum first, restaurant second.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium comprising a memory having instructions executed by one or more processors to:

receive a request from a user to join a plurality of virtual queues of a plurality of physical locations;

determine an estimated wait time for the user in each one of the plurality of virtual queues;

in response to determining two of the plurality of virtual queues have a same estimated wait time, automatically remove the user from one of the two of the plurality of virtual queues;

optimize a queue order for the plurality of virtual queues based on the estimated wait times;

create an itinerary for visiting a first physical location associated with each one of the plurality of virtual queues of the plurality of physical locations to the user based on the queue estimation;

provide to the user the itinerary and queue order optimization;

provide a physical notification to a physical device of the user responsive to a change in the itinerary or the queue order optimization; and automatically remove the user from a first one of the plurality of virtual queues responsive to a threshold period of time passing before the user arrives at a second physical location associated with the first one of the plurality of virtual queues of the plurality of physical locations.

2. The medium of claim 1, further comprising instructions executed by the processing resource to update the itinerary upon completion of a second one of the plurality of virtual queues.

3. The medium of claim 1, further comprising instructions executed by the processing resource to provide a notification to the user of the user's position in each one of the plurality of virtual queues.

4. The medium of claim 1, further comprising instructions executed by the processing resource to remove the user from the first one of the plurality of virtual queues responsive to:

the user reaching the front of the first one of the plurality of virtual queues.

5. The medium of claim 1, comprising instructions executed by the processing resource to update the itinerary based on changes associated with a different user to at least one of the plurality of virtual queues.

6. The medium of claim 1, comprising instructions executed by the processing resource to provide a virtual queue of the plurality of virtual queues to a computing device at an associated physical location of the physical locations.

7. The medium of claim 1, comprising instructions executed by the processing resource to add the user to each one of the plurality of virtual queues responsive to receipt of the request.

8. The medium of claim 1, comprising instructions executed by the processing resource to determine the queue order optimization by selecting a physical location for each event from a plurality of physical locations for each event based on an estimated wait time for the user in a virtual queue for each event.

9. The medium of claim 8, comprising instructions executed by the processing resource to add the user to each one of the plurality of virtual queues based on the queue order optimization.

10. A non-transitory machine-readable medium comprising a memory having instructions executed by one or more processors to:

receive a request from a user to join a plurality of virtual queues of physical locations;

add the user to each one of the plurality of virtual queues;

determine an estimated wait time for the user in each one of the plurality of virtual queues;

in response to determining two of the plurality of virtual queues have a same estimated wait time, automatically remove the user from one of the two of the plurality of virtual queues;

optimize a queue order for the plurality of virtual queues by selecting virtual queues of the plurality of virtual queues with a shortest estimated wait time;

create an itinerary for visiting each one of the plurality of selected virtual queues to the user based on the estimated wait times;

provide to the user the itinerary and queue order optimization;

provide a physical notification to a physical device of the user responsive to a change in the itinerary or the queue order optimization;

automatically remove the user from a first one of the plurality of virtual queues responsive to a threshold period of time passing before the user arrives at a physical location associated with the first one of the plurality of virtual queues;

provide another notification to the user regarding the itinerary; and automatically remove the user from each virtual queue except the selected virtual queues based on the queue order optimization, wherein the notification comprises a notification of a change in the estimated wait time of a second one of the plurality of selected virtual queues.

11. The medium of claim 10, comprising instructions executed by the processing resource to suggest an additional physical location to add to the itinerary based on the physical locations in the plurality of selected virtual queues, the created itinerary, and a location of the user.

12. The medium of claim 10, wherein the another notification comprises a notification of a change in the itinerary.

13. The medium of claim 10, wherein the notification comprises a notification of a position of the user in one of the plurality of selected virtual queues.

14. The medium of claim 10, wherein the notification comprises a notification of a window of time before the user is removed from the queue.

15. The medium of claim 10, further comprising instructions executed by the processing resource to create and display a map of the itinerary.

16. A method, comprising:

receiving, by a processing resource, a request from a user to join a plurality of virtual queues of physical locations;

adding, by the processing resource, the user to the plurality of virtual queues;

determining, by the processing resource, an estimated wait time for the user in each one of the plurality of virtual queues;

optimizing a queue order for the plurality of virtual queues based on the estimated wait times;

in response to determining two of the plurality of virtual queues have a same estimated wait time, automatically remove the user from one of the two of the plurality of virtual queues;

creating, by the processing resource, an itinerary for visiting a physical location associated with each one of the plurality of virtual queues to the user based on the estimated wait times;

suggesting, by the processing resource, an additional physical location to add to the itinerary based on the physical locations in the plurality of selected virtual queues, the created itinerary, and a location of the user;

providing to the user the created itinerary and queue order optimization;

automatically removing the user from one of the plurality of virtual queues responsive to a threshold period of time passing before the user arrives at a physical location associated with the one of the plurality of virtual queues; and providing a physical notification to a physical device of the user responsive to a change in the itinerary or the queue order optimization.

17. The method of claim 16, comprising providing a notification to the user regarding the itinerary.

18. The method of claim 17, comprising removing the user from each virtual queue except the selected virtual queues based on the queue order optimization, wherein the notification comprises a notification of a change in the estimated wait time of a different one of the plurality of selected virtual queues.

19. The method of claim 17, comprising determining the queue order optimization by selecting virtual queues of the plurality of virtual queues with a shortest estimated wait time.

20. The method of claim 16, comprising receiving the request to join the plurality of virtual queues for each physical location having a physical queue, wherein each of the plurality of physical queues and each of the plurality of virtual queues are different queues.

* * * * *